Patented Feb. 12, 1952                                                    2,585,723

UNITED STATES PATENT OFFICE 2,585,723

PRODUCTION OF ALIPHATIC ACIDS

Fred W. Banes, Westfield, William P. Fitz Gerald, Elizabeth, and Joseph F. Nelson, Rahway, N. J., assignors to Standard Oil Development Company, a corporation of Delaware No Drawing. Application July 13, 1950,
Serial No. 173,676

5 Claims. (Cl. 260—533)

This invention relates to a new process for manufacturing saturated aliphatic carboxylic acids of increased molecular weight by reaction between a lower molecular weight saturated aliphatic carboxylic acid and one or more moles of ethylene. In particular the invention is concerned with a novel process for producing saturated aliphatic carboxylic acids of 3 to 13 carbon atoms per molecule by reacting a saturated carboxylic acid of 1 to 5 carbon atoms per molecule with ethylene at comparatively low superatmospheric pressure in the presence of a peroxide activator.

According to the prior art when an aliphatic carboxylic acid was reacted with ethylene the reaction was carried out at extremely high superatmospheric pressures and the product was a hard solid material of questionable identity, and not readily separable into its components as for example by distillation.

It is an object of this invention to produce substantially liquid acid addition products of comparatively low average molecular weight, not substantially above about 185, from reaction of ethylene and saturated aliphatic carboxylic acids of 1 to 5 carbon atoms per molecule. The reaction product is composed of 1 mole of the original acid and one or more molecules of ethylene.

It has been found that saturated aliphatic carboxylic acids containing 3 to 13 carbon atoms per molecule are prepared by reacting saturated aliphatic carboxylic acids containing 1 to 5 carbon atoms per molecule with one or more moles of ethylene at pressures of 250-2500 p. s. i. and at temperatures of 75-300° C. in the presence of a peroxide-type activator. Formic, acetic, propionic and the butyric acids are preferred starting materials. The reaction rates of the $C_6$ and higher acids are so low in comparison to the $C_1$ to $C_5$ acids as to classify them as practically non-reactive.

Reaction conditions

The reaction between the acid and ethylene is carried out at temperatures of 75° C. to 300° C., preferably 125° C. to 200° C., and more preferably 145° C. to 170° C. Temperatures above 300° C. are to be avoided because at these higher temperatures decomposition of the peroxide activator is too rapid for greatest effectiveness to be realized.

The pressure at which the reaction is carried out depends upon the molecular weight of the particular product desired. Pressures in the range of 250-2500 p. s. i., preferably 800-1200 p. s. i., are employed. Uniform pressure is maintained by continuous addition of ethylene to the reaction zone.

The ratio of acid to ethylene employed in the reaction is not critical. It is preferred to use 1 to 5 parts by weight of acid per part of ethylene charged to the reactor. Molar ratios of acid to ethylene of from 1:1 to 40:1 may be employed.

Peroxide activator

Peroxides or hydroperoxides are employed as activators for the reaction and the temperature of the reaction will depend to some extent upon the particular peroxide employed. Temperatures in the range of 75-300° C. have been found suitable. For example, one can operate in the range of 50-150° C. with activators such as t-butyl hydroperoxide and benzoyl peroxide, and at 125-250° C. with materials such as cumene hydroperoxide and di-t-butyl peroxide. Generally a total of 0.01 to 0.5 part of activator is employed per part of ethylene charged to the reactor. The amount of activator employed depends on several factors among which are molecular weight of product desired and method of activator addition to the reaction. When operating a batch process it is preferred that the activator be added in increments to the reactor since in this manner the reaction proceeds more uniformly and better reaction rates and more uniform products are obtained. Suitable peroxides are di-t-butyl peroxide, t-butyl hydroperoxide, 2,2-bis(t-butyl peroxy) butane, benzoyl peroxide, cumene hydroperoxide, tetralin hydroperoxide, hydrogen peroxide, t-butyl perbenzoate, diisopropyl benzene hydroperoxide, di-t-butyl perphthalate or peradipate, acetyl peroxide, urea peroxide, or mixtures of two or more of the same. Ether peroxides are also suitable such as diisopropyl ether peroxide, diethyl ether peroxide, methyl isobutyl ether peroxide, dioxane peroxide, etc. The peroxidized ethers are well known chemicals and are prepared simply by contacting the ether with air or oxygen.

Reaction mechanism

It is believed that the peroxide serves as an activator for the acid molecule by detaching a hydrogen atom therefrom thus producing an active radical. For example, acetic acid releases a hydrogen atom from the methyl group and forms a free radical of the type: $CH_2COOH$.

This radical in turn initiates reaction with one or more molecules of ethylene to produce carboxylic acid radicals which are converted to carboxylic acids by reaction with hydrogen, the reaction thereby being sustained by a chain transfer mechanism. The products resulting from the reaction of the carboxylic acid radical with one mole of ethylene may in turn become activated and the resulting activated radicals again in turn react with additional molecules of ethylene.

The invention is illustrated by the following experimental examples:

EXAMPLE 1

A 1.8 liter stainless steel bomb was charged with 1000 cc. of 80% acetic acid and 30 cc. of di-t-butyl peroxide. The bomb was placed in a rocker, agitated constantly, and the temperature raised to 145° C. at which time the bomb was pressured to 800 p. s. i. with ethylene.

After four hours the bomb was cooled, the excess ethylene bled off and the crude reaction mixture recovered. The water and acetic acid was stripped off in a ten-plate Oldershaw column. The bottoms from the stripping, which represented the product, weighed 250 grams.

The product was fractionated in a Todd column. Several of the constituents were isolated and identified. Data relating to these products are tabulated in the following table.

that the first addition product would have the following structure:

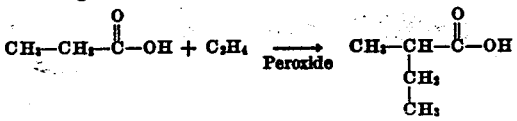

This addition product, alpha methyl butyric acid, has the empirical formula: $C_5H_{10}O_2$, a molecular weight of 102, and the following physical constants:

Boiling point _____ ° C__ 174.7
Density _____ 0.941
Refractive index_____ 1.4051

The first fraction was collected between 174° C. and 175° C. It has a density of 0.938 and a refractive index of 1.4047. An acid number of 0.8995 ceq./gm. was determined on the fraction, indicating a molecular weight of 105.5. The material constituting this fraction is therefore substantially pure alpha methyl butyric acid.

The next predicted constituents would have the

Table

| Cut No. | Boiling Range | Constituent | Exp. Values | | | Lit. Values | | |
|---|---|---|---|---|---|---|---|---|
| | | | Sp. Gr. | R. I. | Acid No. | B. Pt. | Sp. Gr. | R. I. |
| | | | | | | ° C. | | |
| 1 | 63–90° C. at 50 mm | n-Butyric Acid | 0.968 | 1.4000 | {1.030 (90%)} | 164 | 0.967 | 1.3979 |
| 2 | 112–122° C. at 45 mm | n-Caproic Acid | 0.9206 | 1.4185 | {0.571 (66%)} | 202 | 0.9210 | 1.4145 |
| 3 | 140–152° C. at 44 mm | {n-Caprylic Acid and C₈ Isomers} | 0.9136 | 1.4288 | {0.570 (82%)} | 237 | 0.9140 | 1.4268 |
| 4 | 158–178° C. at 44 mm | {n-Capric Acid and C₁₀ Isomers} | 0.9036 | 1.4388 | {0.510 (88%)} | 268 | 0.8950 | 1.4308 |

The fractions shown in this table represent about 75% of the total product. The products boiling above about 320° C. were of grease- or lard-like consistency and represented some 15% of the total product.

EXAMPLE 2

A charge consisting of 980 cc. of propionic acid (Du Pont) and 20 cc. of di-t-butyl peroxide was placed in a 1.8 liter stainless steel bomb. The heated to 150° C. and pressured to 1000 p. s. i. with ethylene. During the course of a 2-hour run the temperature and pressure were maintained at the above-mentioned level. At the conclusion of the run the bomb was cooled, the excess ethylene bled off, and the reaction mixture recovered.

Unreacted propionic acid was removed by distillation. The product, amounting to 231.5 gms. was a liquid having an acid number of 0.546 centi-equivalents per gram, or an average molecular weight of about 185. A sample of the product was fractionated to determine product distribution and the following values were obtained:

Percent boiling <200° C____
Percent boiling 200–320° C__
Percent boiling >320° C____
21.2 (C₅ acids) (liquid)
57.1 (C₇–C₁₃ acids) (liquid)
21.7 (C₁₅+ acids) (solid)

The fraction boiling between 200 and 320° C. had an acid number of 0.493 ceq./gm. and a molecular weight of about 205. This is evidence of the presence of one carboxyl group per molecule.

Another sample of the total reaction product was fractionated in a column containing glass helices as packing for product identification.

The reaction of propionic acid and ethylene has been postulated to follow a mechanism such empirical formula: $C_7H_{14}O_2$, a boiling range of 203° C. to 222° C., and the following structures:

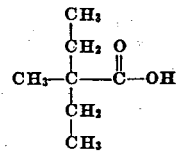

3-methyl-3-ethyl butyric acid and

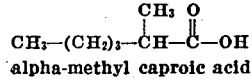

alpha-methyl caproic acid

A fraction taken between 210° C. and 224° C. (107 and 114° C. at 12 mm.) had a density of 0.9207, a refractive index of 1.4270, and an acid number of 0.6574 ceq./gm. From these data it is concluded that the fraction contained between 86 and 90% branched chain C₇ acids, i. e., a mixture of 3-methyl-3-ethyl butyric acid and alpha-methyl caproic acid.

Liquid acids were obtained up to a product boiling point of about 320° C. The specific acids were not identified because of the difficulty of obtaining adequate purity by distillation. Solid acids were obtained and represented about 20% of the product.

EXAMPLE 3

The stainless steel reactor was charged with 1250 cc. of a commercial technical grade isobutyric acid and 15 cc. of di-t-butyl peroxide, heated to 170° C., and pressured to 850 p. s. i. with ethylene. After one, two and three hours had elapsed, additions consisting of 15 cc. of di-t-butyl peroxide in 85 cc. of isobutyric acid were made to the reactor. At the end of four hours the reaction mixture was withdrawn and the product recovered by distilling off the residual isobutyric acid.

The resulting liquid product weighed 449 gms. and had an acid number of 0.651 ceq./gm. indicating an average molecular weight of about 155.

The product distribution was determined by fractionating a sample of the product into the following three broad cuts:

Percent boiling <200° C. _____(liquid)__ 33.7
Percent boiling 200–320° C. _____(liquid)__ 59.2
Percent boiling >320° C. _____(solid)__ 7.1

The second fraction (200–320° C.) had an acid number of 0.593 ceq./gm. which corresponds to an average molecular weight of about 170.

On the basis of the postulated mechanism of reaction, the first reaction product would be synthesized in the following manner:

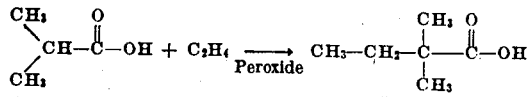

This compound having the empirical formula: $C_6H_{12}O_2$, a molecular weight of 116, and a boiling point of 187° C. is commonly referred to in the literature as alpha, alpha-dimethyl butyric acid or di-methyl ethyl acetic acid. From literature sources it has been found that for $C_6$ aliphatic acids the density will be about 0.900 to 0.935 and the refractive index in the neighborhood of 1.4145.

A sample of the total product was fractionated at atmospheric pressure and the fraction boiling between 186° C. and 187° C. was collected. The fraction had a density of 0.9314, a refractive index of 1.4145 and an acid number of 0.9544 ceq./gm. From the acid number it is evident that the fraction was essentially 100% acid and the order data identifies the compound as alpha-alpha-dimethyl butyric acid.

The second reaction product, having the empirical formula: $C_8H_{16}O_2$ and a molecular weight of 144, would have, on the basis of previous postulations, the following structure:

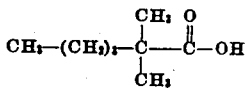

This acid, named alpha-alpha-dimethyl caproic or dimethyl n-butyl acetic acid, boils in the range of 220–222° C. Literature sources reveal that $C_8$ aliphatic acids have densities in the neighborhood of 0.910 and refractive indices in the neighborhood of 1.4268.

A fraction boiling between 142 and 143° C. at 50 mm. (220–222° C.) was found to have a density of 0.9186 and a refractive index of 1.4265. An acid number of 0.6316 ceq./gm. is indicative of an acid content of about 92% (assuming a molecular weight of 144 for the $C_8$ acids). This fraction contains a high percentage of the $C_8$ acid, alpha-alpha-dimethyl caproic acid.

Although only the acids boiling below 220° C. have been isolated and identified, it is obvious that $C_{10}$ and $C_{12}$ acids are also present in the product and that these acids have the same general structure, i. e.

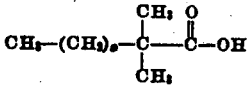

as those cited above.

A portion of the product (B. P. >320° C.) was solid acids of lard-like consistency. Such acids represented less than 10% of the total product.

The reaction may be carried out batchwise or in a continuous or semi-continuous manner.

Under the conditions of operation noted in the foregoing sections, a mixture of saturated, aliphatic acids are obtained. The bulk of these acids are low molecular weight, liquid products at temperatures of 30–40° C. although invariably a few percent of the product is in the form of high molecular weight, solid acids. The ratio of liquid to solid products may be varied by changing operational conditions such as reaction temperature and/or pressure or the ratio of the co-reactants. For example, higher acid contents of the feed, higher operating temperatures or lower reaction pressures favor the production of liquid products.

Having described the invention in a manner such that it can be practiced by those skilled in the art, what is claimed is:

1. A process for preparing a mixture of even numbered saturated aliphatic carboxylic acids containing 4 to 10 carbon atoms per molecule which comprises reacting acetic acid with ethylene in the presence of di-tertiary butyl peroxide at a temperature of 145° C. to 170° C. and at a pressure of 800 to 1000 p. s. i. for a period of one to four hours and recovering even numbered saturated carboxylic acids containing 4 to 10 carbon atoms per molecule from the reaction.

2. A process for preparing a mixture of saturated aliphatic carboxylic acids containing alpha methyl butyric acid which comprises reacting propionic acid with ethylene in the presence of di-tertiary butyl peroxide at a temperature of 145° C. to 170° C. and at a pressure of 800 to 1000 p. s. i. for a period of one to four hours and recovering a mixture of saturated aliphatic carboxylic acids containing alpha methyl butyric acids.

3. A process according to claim 2 in which the mixture also contains 3-methyl-3-ethyl butyric acid and alpha-methyl caproic acid.

4. A process for preparing a mixture of alpha-alpha-dimethyl-ethyl acetic acid and alpha-alpha dimethyl caproic acid which comprises reacting iso-butyric acid with ethylene in the presence of di-tertiary butyl peroxide at a temperature of 145° C. to 170° C. and at a pressure of 800 to 1000 p. s. i. for a period of one to four hours and recovering from the reaction products alpha-alpha dimethyl acetic acid and alpha-alpha dimethyl caproic acid.

5. A process for preparing a mixture of saturated aliphatic carboxylic acids of increased molecular weight which comprises reacting a carboxylic acid containing 1 to 5 carbon atoms per molecule with ethylene in the presence of di-tertiary butyl peroxide at a temperature of 145° C. to 170° C. and at a pressure of 800 to 1000 p. s. i. for a period of one to four hours and recovering a mixture of saturated aliphatic carboxylic acids of increased molecular weight from the reaction.

FRED W. BANES.
WILLIAM P. FITZ GERALD.
JOSEPH F. NELSON.

REFERENCES CITED

The following references are of record in the file of this patent:

UNITED STATES PATENTS

| Number | Name | Date |
| --- | --- | --- |
| 2,402,137 | Hanford et al. | June 18, 1946 |
| 2,433,015 | Roland et al. | Dec. 23, 1947 |